N. GERSON.
CHILD'S VEHICLE.
APPLICATION FILED AUG. 6, 1917.
1,255,595.
Patented Feb. 5, 1918.
2 SHEETS—SHEET 1.
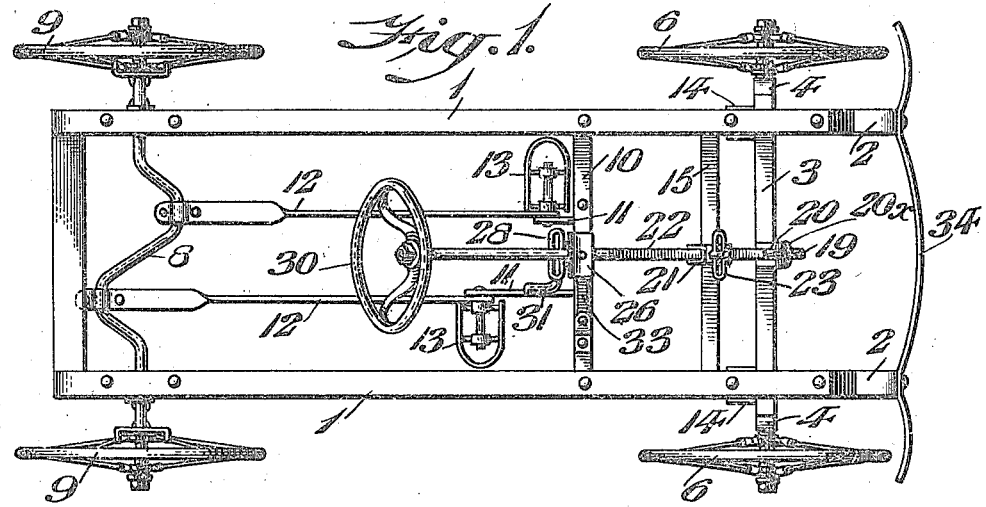
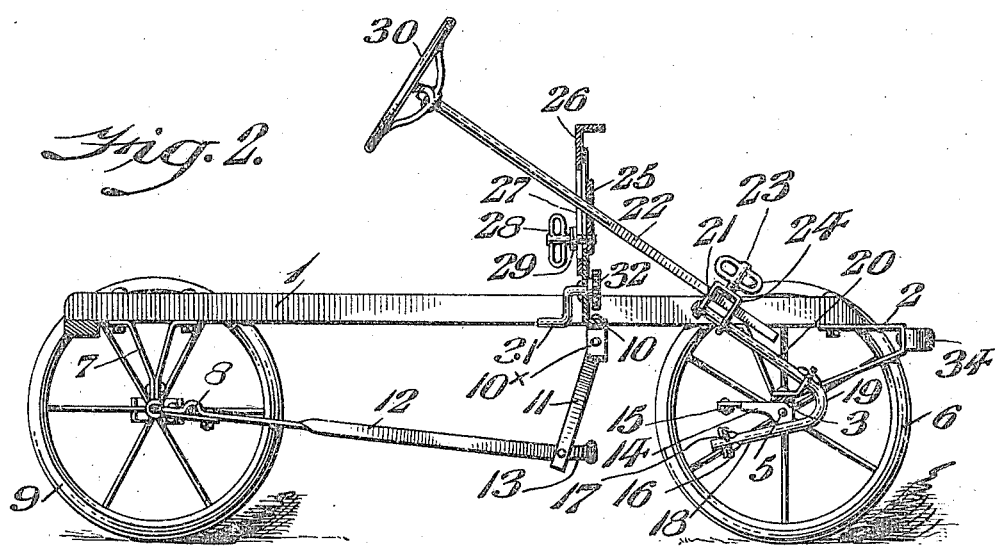
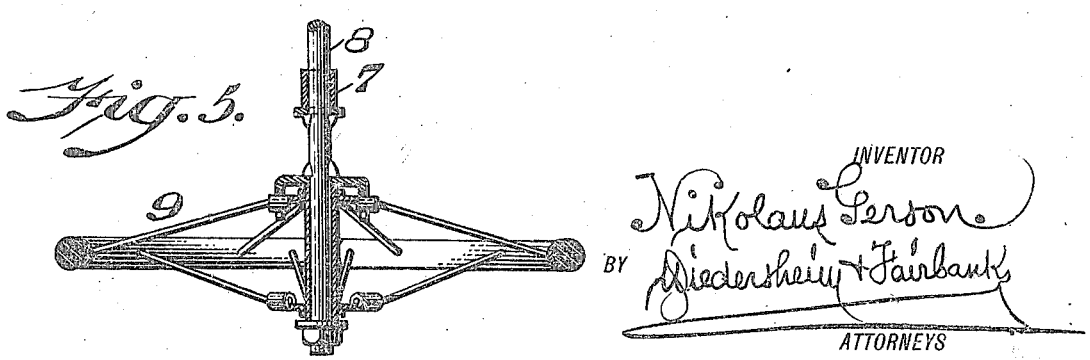
INVENTOR
Nikolaus Gerson
BY Niedersheim & Fairbanks
ATTORNEYS N. GERSON.
CHILD'S VEHICLE.
APPLICATION FILED AUG. 6, 1917.
1,255,595.
Patented Feb. 5, 1918.
2 SHEETS—SHEET 2.
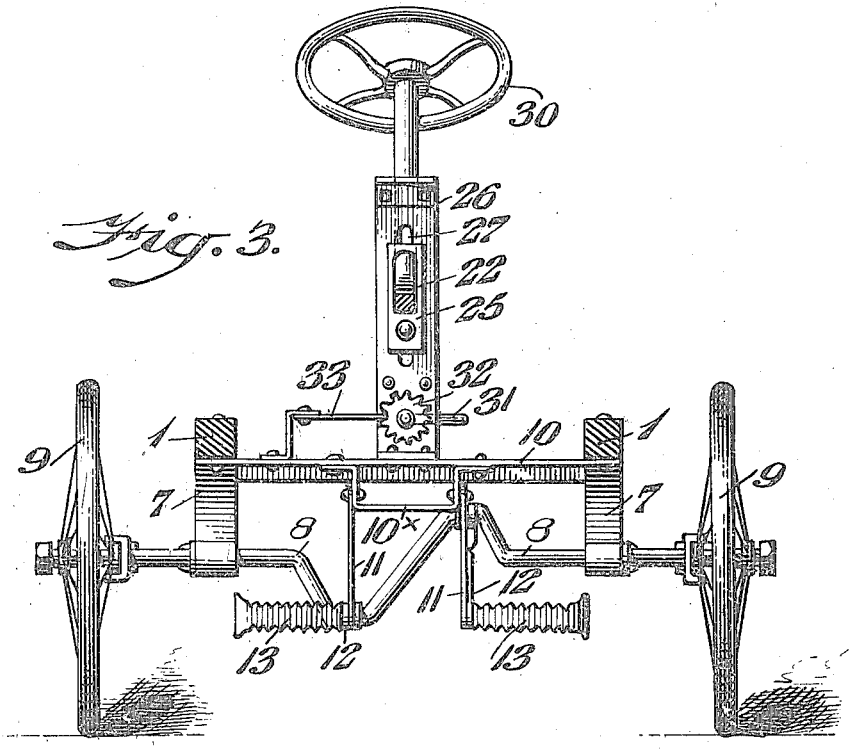
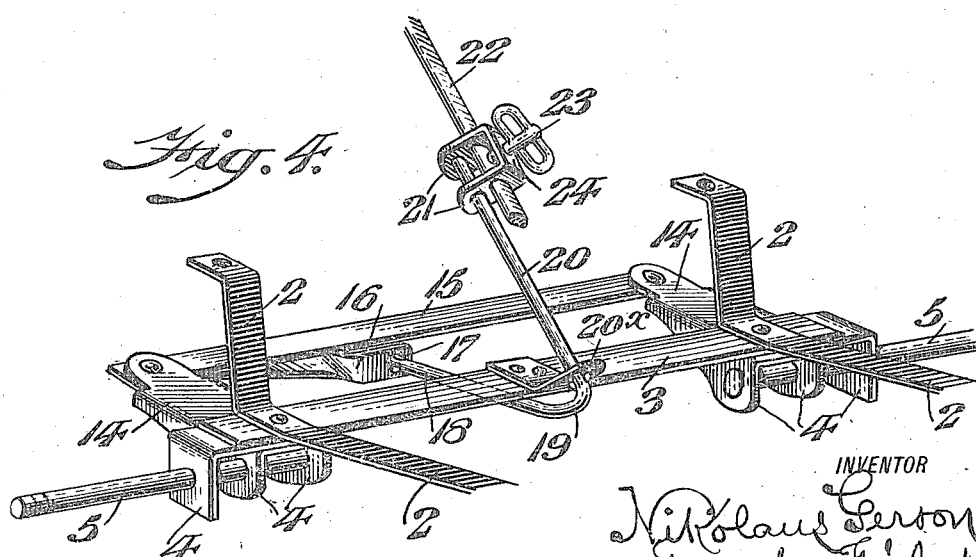
INVENTOR
Nikolaus Gerson.
BY Wiedersheim + Fairbank
ATTORNEYS

UNITED STATES PATENT OFFICE.

NIKOLAUS GERSON, OF PHILADELPHIA, PENNSYLVANIA, ASSIGNOR TO A. MECKY COMPANY, OF PHILADELPHIA, PENNSYLVANIA, A CORPORATION OF PENNSYLVANIA.

CHILD'S VEHICLE.

1,255,595.  Specification of Letters Patent. Patented Feb. 5, 1918.

Application filed August 6, 1917. Serial No. 184,623.

*To all whom it may concern:*

Be it known that I, NIKOLAUS GERSON, a subject of the Emperor of Austria, having resided in the United States one year last past and having declared my intention of becoming a citizen thereof, residing in the city and county of Philadelphia, State of Pennsylvania, have invented a new and useful Child's Vehicle, of which the following is a specification.

My invention consists in providing a child's vehicle with steering mechanism, in which the steering rod is adapted to be adjusted in length so as to set its handle or tiller nearer to or farther from the rider for purposes requiring the same.

It consists also in adapting the steering rod to be adjusted in height so as to raise or lower the handle or tiller according to the requirements of the rider.

It consists also of details of construction as will be hereinafter described.

The invention is satisfactorily illustrated in the accompanying drawing, but the important instrumentalities thereof may be varied, and so it is to be understood that the invention is not limited to the specific details shown and described, as long as they are within the spirit or scope of the claims.

Figure 1 represents a top or plan view of a child's vehicle embodying my invention.

Fig. 2 represents a partial side elevation and partial longitudinal section thereof.

Fig. 3 represents a partial front elevation and partial transverse section thereof.

Fig. 4 represents a perspective view of a portion of the front of the running gear on an enlarged scale.

Fig. 5 represents a diametrical section of one of the wheels of the vehicle on an enlarged scale.

Similar numerals of reference indicate corresponding parts in the figures.

Referring to the drawings:—

1 designates the side bars of the frame of the vehicle, the same having members of the running gear connected therewith, viz., the front hangers 2, the cross bar 3 connected therewith, the ears 4 which are pivotally connected with said cross bar, the separate axles 5 which are mounted in said ears as their bearings, the front wheels 6 on said axles, the rear hangers 7, the double crank axle 8, the rear wheels 9 connected with the latter, the cross bar or brace 10 on said side bars 1 intermediate of the front and rear hangers 2 and 7, the swinging arms 11, which depend pivotally from the member $10^x$ on the bar 10, the bars or rods 12 which are pivotally connected with said arms 11, and extend to said double crank shaft 8 for operating the latter, and the pedals 13 which are connected with the joints of the bars or rods 12, and the swinging arms 11 whereby the vehicle may be propelled which several members *per se* are known in the art.

The bodies 14 of the opposite set of ears 4 are coupled by the cross bar 15 whose ends are pivotally connected with said bodies, whereby the front wheels may be turned with their axles and bearing ears in unison for steering purposes.

To one end of said bar 15 and consequently to the body of the adjacent ear is pivotally connected the link 16 which is also pivotally freely connected with a limb 18 of a laterally rocking elbow 19 whose other limb 20 is journaled freely in the ear $20^x$ as the bearing therefor, said ear being firmly connected with the cross bar 3 of the running gear.

The upper end of the limb 20, and consequently of the elbow is fixed in the rocking clevis or yoke 21, through which is also passed the rotatable steering rod 22 which is adapted to be engaged by the point of the screw or bolt 23 which is fitted in the crown or top 24, the elbow thus in a measure forming a continuity of the steering rod. A portion of said steering rod 22 above said clevis is mounted in the vertically sliding piece 25 which is connected with the standard 26, whose lower end is firmly connected with the cross bar or brace 10, it being noticed that said standard has thereon the vertically extending slot 27 through which is passed the screw 28 whose threaded end is adapted to enter the lower portion of the slide 25, when by means of the washer 29 on the shank of the screw the latter is adapted to clamp the slide firmly to the standard, it being noticed that when said screw is loosened, the slide may be moved up or down, and with it the steering rod and elbow for vertical adjustment of said rod, according to the requirements of the rider.

The elbow 19 follows the motion of the steering rod, it being evident also that when the screw 23 is loosened the steering rod may be moved forwardly or rearwardly so its length may be said to be shortened or increased for the requirements of the rider of the vehicle.

The upper end of the steering rod is provided with the hand wheel or tiller 30, usual in such cases for evident purposes.

It is evident that when the steering rod is adjusted in length and height, the respective screws are tightened, when said rod may be operated, the elbow 19, the link 16, the ears 4, the divided axles 5, may cause the wheels to steer the vehicle in a convenient and effective manner.

On the standard is mounted the hand crank 31 to the forward end of which is connected the ratchet or toothed wheel 32, whose teeth are adapted to be engaged by the free end of a spring plate 33, whose other end is firmly connected with the cross bar or brace 10 of the side bars 1, it being evident that when the wheel 32 is rotated by the crank 31, the spring plate 33 will be tripped on the teeth of said wheel and caused to produce a sound as a rattle or an alarm to those in the path of the vehicle.

To the front hangers is secured the fender 34 for evident purposes.

Excepting the side bars 1 which are made of wood, the other members described are formed preferably of suitable metal, to which material, however, I do not limit myself.

Having thus described my invention what I claim as new and desire to secure by Letters Patent, is:—

1. In a velocipede, a steering device composed of a steering rod proper, an elbow connected with the running gear, a member adapted to couple said elbow and rod, and a tightening device on said member for said elbow and rod, said elbow being fixed to said coupling member and said rod being connected with said member by said tightening device and slidable in said member.

2. In a velocipede, a rotatable steering rod in combination with a standard rising from the running gear, a vertically sliding piece on said standard and adapted to have said steering rod passed through the same, said standard having therein a vertically extending slot through which said steering rod is also passed, and a tightening screw passed freely through said slot and being connected with said sliding piece and adapted to retain said sliding piece in vertically adjusted position with said steering rod fitted in the same.

3. In a child's vehicle, a rotatable steering rod, an elbow, a device for adjustably connecting said elbow and rod, said elbow being fixed to said device, and said rod being slidingly fitted therein, a link connectible with said elbow, divided axles for the wheels, and bearings for said axles, said link being also connectible with said bearings.

4. In a child's vehicle, a rotatable steering rod, a rocking elbow, bearings for the latter and said rod, and mechanism connected with said elbow and the bearings of the axles of the wheels for steering the latter, and a coupling device for said elbow and steering rod composed of a member with which said rod and a limb of said elbow are received, said elbow having its upper limb secured to said coupling device, and said steering rod having its lower portion slidably movable in the same, and a tightening device on said member adapted to engage said steering rod.

5. In a child's vehicle, a rotatable steering rod, a rocking elbow, bearings for the latter and said rod, and mechanism connected with said elbow and the bearings of the axles of the wheels for steering the latter and said elbow, and a coupling device for said elbow and steering rod composed of a member in which said rod is slidingly fitted and to which said elbow is secured, and a tightening device on said member adapted to engage said steering rod.

6. In a child's vehicle, bearings for the axles of the wheels, a link-member pivotally connected with said bearings, a steering rod, and a rocking elbow member intermediate of said steering rod and said link and freely pivotally connectible with said link member, and a coupling for said elbow and rod, said rod being slidingly fitted in said coupling, and said elbow being fixed to the same.

7. In a child's vehicle, bearings for the axles of the wheels, a link-member pivotally connected with said bearings, a steering rod, and a rocking elbow member intermediate of said steering rod and said link and freely pivotally connectible with said link, said rod and elbow being adapted to be rotated, said rod being adapted to be longitudinally adjustable on its connection with said elbow.

8. In a child's carriage, bearings for the wheels therefor, a rocking elbow, a connection for said bearings with said elbow, a steering rod, a connection for said elbow and said rod, said rod being longitudinally adjustable in said connection and said elbow being fixed to the latter, a vertically slidable bearing for said steering rod, a support on the running gear for said slidable bearing, and means for tightening the latter on said support.

9. In a child's carriage, a steering rod, a sliding bearing member for said rod admitting of the vertical adjustment of the latter, a standard on the running gear provided with a vertically extending slot, and a tightening screw adapted to pass through said slot into said bearing member and to be connected with the same, and to clamp said bearing member to said standard in the vertical adjustment of the member.

10. In a velocipede, a steering rod, a rotatable elbow connected with the running gear, a coupling device to which the upper limb of said elbow is secured, said rod being slidable in said coupling device, a tightening screw on the latter adapted to engage said steering rod, a vertically sliding piece in which said steering rod is freely received and rotatable, a standard rising from the running gear having therein a vertical slot adapted to freely receive said rod, said piece being fitted to said standard and adapted to slide in vertical direction, and a tightening screw passing freely through said slot and connected with said sliding piece.

11. In a velocipede, a steering rod and elbow, a coupling device for said elbow and rod, and a bearing eye on the running gear, adapted to receive said elbow and permit the latter to be rotated and raised and lowered therein.

NIKOLAUS GERSON.

Witnesses:
ALBERT E. PARKER,
WILLIAM H. WICHMAN.